United States Patent Office 3,808,225
Patented Apr. 30, 1974

3,808,225
PROCESS FOR THE PREPARATION OF 4(5)-CYANO-IMIDAZOLE-5(4)-CARBOXYAMIDE BY REACTING DIAMINOMALEONITRILE WITH FORMIC ACID
Norio Asai, Chiba, Japan, assignor to Sagami Chemical Research Center, Tokyo, Japan
No Drawing. Filed Dec. 8, 1971, Ser. No. 206,160
Claims priority, application Japan, Dec. 9, 1970, 45/108,580
Int. Cl. C07d 49/36
U.S. Cl. 260—309   4 Claims

ABSTRACT OF THE DISCLOSURE

An improved process for the preparation of 4(5)-cyanoimidazole-5(4)-carboxyamide of the formula

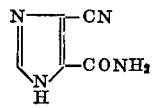

which is useful as a precursor for the synthesis of various compounds comprising reacting diaminomaleonitrile of the formula

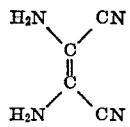

with formic acid in an aromatic solvent is disclosed.

---

This invention relates to a process for the preparation of 4(5)-cyanoimidazole-5(4)-carboxyamide (this term includes both 4-cyanoimidazole-5-carboxyamide and 5-cyanoimidazole-4-carboxyamide). More particularly, this invention relates to a process for the preparation of 4(5)-cyanoimidazole-5-(4)-carboxyamide of the formula

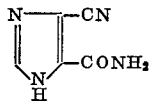

which comprises reacting diaminomaleonitrile of the formula

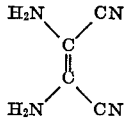

with formic acid in an organic solvent.

This reaction product, 4(5)-cyanoimidazole-5(4)-carboxyamide, obtained in accordance with the process of this invention is useful as a precursor for the synthesis of various pharmaceuticals. For example, 4(5)-cyanoimidazole-5(4)-carboxyamide is subjected to the Hofmann rearrangement to produce 4(5)-aminoimidazole-5(4)-carbonitrile which can then be reacted with formic acid, urea or ammonium formate to produce hypoxanthine, isoguanine or adenine, respectively. Guanine and isoguanine themselves are known to be a precursor of nucleic acids and also have various uses such as the synthesis of caffeine, theophylline and theobromine which are important pharmaceuticals. Thus, the product of this invention, 4(5)-cyanoimidazole-5(4)-carboxyamide, is extremely valuable in industry.

Some processes for the preparation of 4(5)-cyanoimidazole-5(4)-carboxyamide have been reported, but each of the known processes is disadvantageous, either because the starting materials are not easily available or the practical operations difficult to carry out, and therefore is not satisfactory for the production of the compounds on an industrial scale.

For example, the typical well-known process for the synthesis of 4(5)-cyanoimidazole-5(4)-carboxyamide includes the procedure comprising the reaction of diaminomaleonitrile with an orthoester to produce 4,5-dicyanoimidazole which is subsequently hydrolyzed to 4(5)-cyanoimidazole-(5)-carboxyamide, as disclosed U.S. Pat. 2,534,331 and Bull. Chem. Soc. Japan, 41, 241 (1968), but this known process is not advantageous because it requires two steps in its operation.

The object of this invention is therefore to provide an improved process for the preparation of 4(5)-cyanoimidazole-5(4)-carboxyamide which does not have the disadvantages associated with the conventional processes.

Another object of this invention is to provide a process for the preparation of 4(5)-cyanoimidazole-5(4)-carboxyamide which can conveniently be carried out under mild conditions and is suitable for production on an industrial scale.

The process of this invention is illustrated by the following reaction equation:

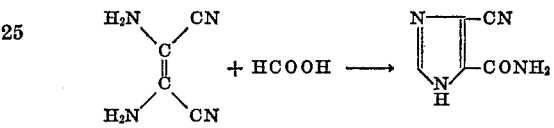

Diaminomaleonitrile used as a starting material of the process of this invention is a known compound and can easily be prepared by well-known procedures such as those described in the specification of German patent publication No. P 20 22 243.9 laid open on Nov. 9, 1970. As described above, the process of this invention is characterized in that formic acid is used, which has various advantages as a raw material for reactions on an industrial scale, and that the desired product can be produced by a single-step of the reaction from the above starting materials.

In the process of this invention, formic acid is generally used in a proportion of about one to 2 parts by weight per one part by weight of diaminomaleonitrile and is preferably used in an excess amount relative to diaminomaleonitrile. In the reaction, the use of an inert solvent is critical, and the solvent used in the process of this invention must be one which does not take part in the reaction nor adversely affect the starting materials and the product. An inert organic solvent such as toluene, ethylbenzene, xylene and anisol is preferred because of their properties and availability.

The basic reaction of this invention is the cyclization of diaminomaleonitrile with formic acid, and the reaction proceeds smoothly by heating a mixture of the reactants and a solvent at a refluxing temperature of the mixture. The reaction time varies with the refluxing temperature, but the reaction is usually completed within about from five to seven hours.

Under the above conditions, the desired product, 4(5)-cyanoimidazole-5(4)-carboxyamide can be obtained in high yield. The thus obtained product may be isolated from the reaction mixture and then purified by any one of the conventional procedures such as concentration of the mixture to dryness and recrystallization of the product from a suitable solvent to give a purified crystalline product.

Thus, in accordance with the process of this invention, (4)5-cyanoimidazole-5(4)-carboxyamide can be prepared in high yield in a single step from a diaminomaleonitrile, and, because it uses formic acid, the process has advantages and is more economical than the prior art procedures when carried out on an industrial scale.

The process of this invention is further illustrated by the following examples, but they are not to be construed as limiting the scope of the present invention.

EXAMPLE 1

Six grams of diaminomaleonitrile and 6.0 ml. of formic acid (85% aqueous solution) were added to 100 ml. of xylene, and the resulting mixture was heated to reflux for six hours, during which time the reaction proceeded. The resulting reaction mixture was then concentrated to dryness. Water was added to the residue followed by concentration again to dryness. The residue was then recrystallized from water containing activated carbon to give 4.62 g. (61.2% yield) of the product as colorless needle crystals. This product had a melting point of 276° C. (with decomposition) and was identified as 4(5)-cyanoimidazole-5(4)-carboxyamide by infrared absorption spectral analysis.

EXAMPLE 2

According to the procedure described in Example 1 but using 100 ml. of anisol as a solvent in place of 100 ml. of xylene to obtain 4.37 g. (57.9% yield) of the product as colorless needle crystals. This product had a melting point of 276° C. (with decomposition) and was identified as 4(5)-cyanoimidazole-5(4)-carboxyamide by infrared absorption spectral analysis.

EXAMPLE 3

According to the procedure described in Example 1 but using 100 ml. of ethylbenzene as a solvent in place of 100 ml. of xylene to obtain 4.53 g. (59.5% yield) of the product as colorless needle crystals. This product had a melting point of 276° C. (with decomposition) and was identified as 4(5)-cyanoimidazole-5(4)-carboxyamide by infrared absorption spectral analysis.

What is claimed is:

1. A process for the preparation of 4(5)-cyanoimidazole-5(4)-carboxyamide which comprises heating a mixture of diaminomaleonitrile and formic acid in an inert organic solvent at a refluxing temperature for a period of from five to seven hours.

2. A process according to claim 1, wherein said inert organic solvent is selected from the group consisting of toluene, ethylbenzene, xylene and anisol.

3. A process according to claim 1, wherein said formic acid is used in an amount of from 1 to 2 parts by weight per 1 part by weight of diaminomaleonitrile.

4. A process according to claim 1, wherein said formic acid is used in an excess amount relative to diaminomaleonitrile.

References Cited

UNITED STATES PATENTS

| | | | |
|---|---|---|---|
| 2,522,854 | 9/1950 | Brink et al. | 260—309.2 |
| 2,534,331 | 12/1950 | Woodward | 260—309 |

OTHER REFERENCES

C. A. 69: 18,809e (1968), Becke et al.

Ann. Chem. 600: 95–108 (1956), Bredereck et al.

HENRY R. JILES, Primary Examiner

S. D. WINTERS, Assistant Examiner